United States Patent [19]

Lai

[11] Patent Number: 5,082,221
[45] Date of Patent: Jan. 21, 1992

[54] SYMMETRICALLY-ACTUATED ADJUSTABLE LEG ASSEMBLY

[76] Inventor: Shih-Wang Lai, P.O. Box 55-1670, Taipei (10477), Taiwan

[21] Appl. No.: 637,207

[22] Filed: Jan. 3, 1991

[51] Int. Cl.⁵ ............................................ F16M 11/00
[52] U.S. Cl. .................................................. 248/168
[58] Field of Search .................. 248/166, 168, 170, 171

[56] References Cited

U.S. PATENT DOCUMENTS

| | | | |
|---|---|---|---|
| 1,897,449 | 2/1933 | Trowbridge | 248/168 |
| 2,463,655 | 3/1949 | Temple | 248/168 |
| 2,691,501 | 10/1954 | Spencer | 248/168 |

FOREIGN PATENT DOCUMENTS

| | | | |
|---|---|---|---|
| 2216438 | 10/1973 | Fed. Rep. of Germany | 248/168 |
| 2256125 | 4/1974 | Fed. Rep. of Germany | 248/168 |
| 2366509 | 6/1978 | France | 248/168 |

Primary Examiner—Ramon O. Ramirez
Assistant Examiner—Robert A. Olson

[57] ABSTRACT

An adjustable leg assembly includes a vertical tubular support radially pivotally connected with a plurality of legs by a connector, in which a positioning pin having two end portions protruding sidewardly beyond two slots radially formed in two bifurcate plates formed in each forked joint secured on an inner end of each leg, and is adjustably resiliently engageable with any one recess of a plurality of positioning recesses formed in an arcuate cam portion of an arcuate lug radially formed on the connector so that each positioning pin can be symmetrically pulled or actuated by a user's fingers for conveniently adjusting a height of each leg of the vertical support.

3 Claims, 6 Drawing Sheets

5,082,221

SYMMETRICALLY-ACTUATED ADJUSTABLE LEG ASSEMBLY

BACKGROUND OF THE INVENTION

U.S. Pat. No. 4,905,946 also granted to the same applicant of this invention disclosed a leg assembly comprising a tubular member 1 connected with a plurality of radial leg members 3.

However, in adjusting the leg members 3 from the connector 2 of the vertical tubular support 1 of such a conventional leg assembly as shown in FIG. 10, a user should respectively depress the positioning pin members 4 at three locations D1, D2 and D3 to cause inconvenience for the user. This is because a button head of each positioning pin member 4 is asymmetrically protruded sidewardly laterally from each forked joint end 31 of each leg 3, thereby providing a single forcing or depressing point rather than two forcing points respectively disposed on two opposite sides of each forked joint end 31.

It is therefore expected to disclose a positioning pin member 4 which protrudes both rightwardly and leftwardly from each forked joint end 31 of each leg 3 so that a user's two fingers can hold two end portions of each positioning pin member 4 for symmetrically pulling the pin member 4 for disengaging each leg 3 from the connector 2 for conveniently adjusting the height of each leg 3 about the central vertical support 1.

SUMMARY OF THE INVENTION

The object of the present invention is to provide an adjustable leg assembly including a vertical tubular support radially pivotally connected with a plurality of legs by a connector, in which a positioning pin having two end portions protruding sidewardly beyond two slots radially formed in two bifurcate plates formed in each forked joint secured on an inner end of each leg, and is adjustably resiliently engageable with anyone recess of a plurality of positioning recesses formed in an arcuate cam portion of an arcuate lug radially formed on the connector so that each positioning pin can be symmetrically pulled or actuated by a user's fingers for conveniently adjusting a height of each leg of the vertical support.

DETAILED DESCRIPTION

Figure 1:
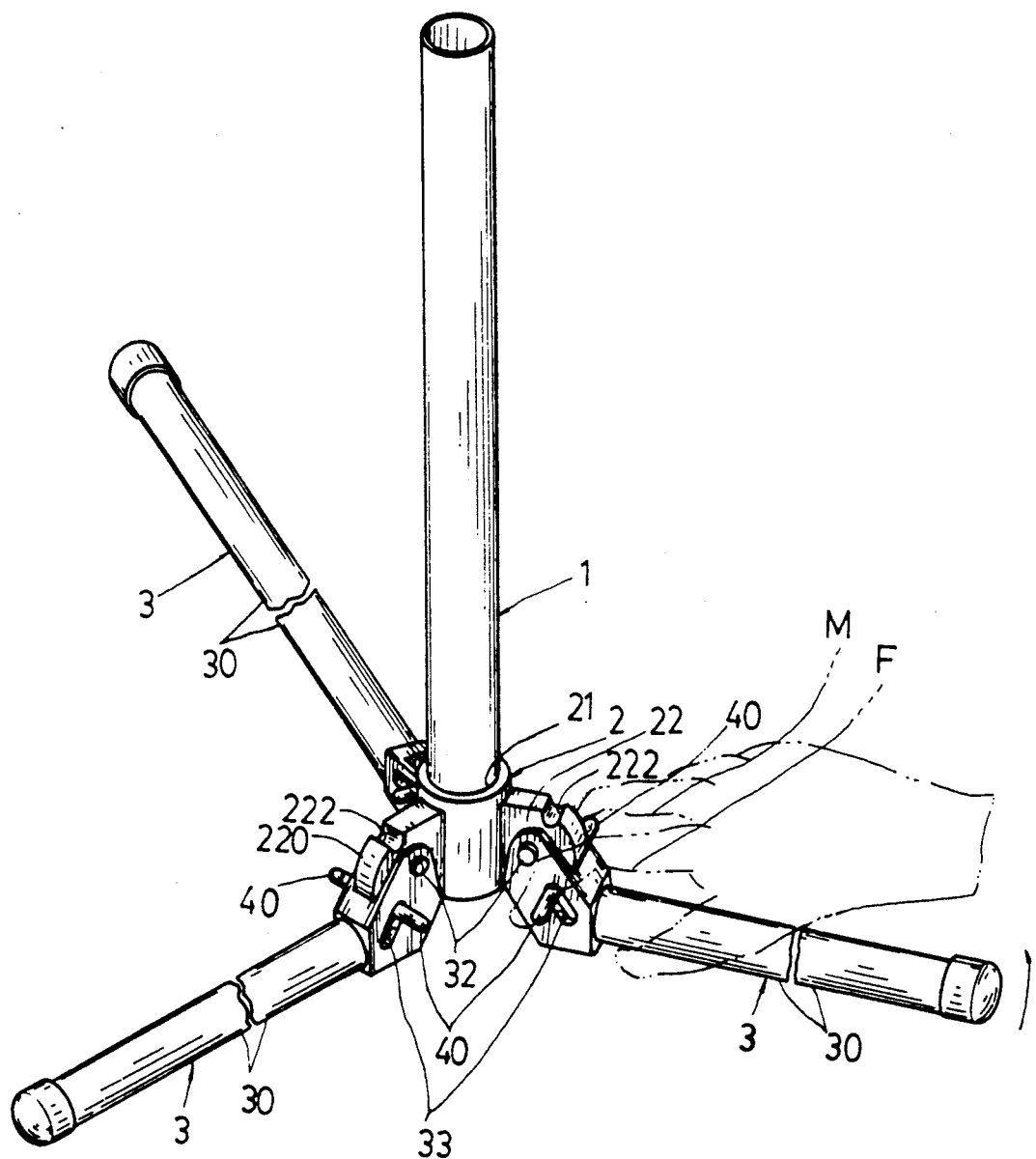
FIG. 1 is a perspective view of the present invention.
Figure 2:
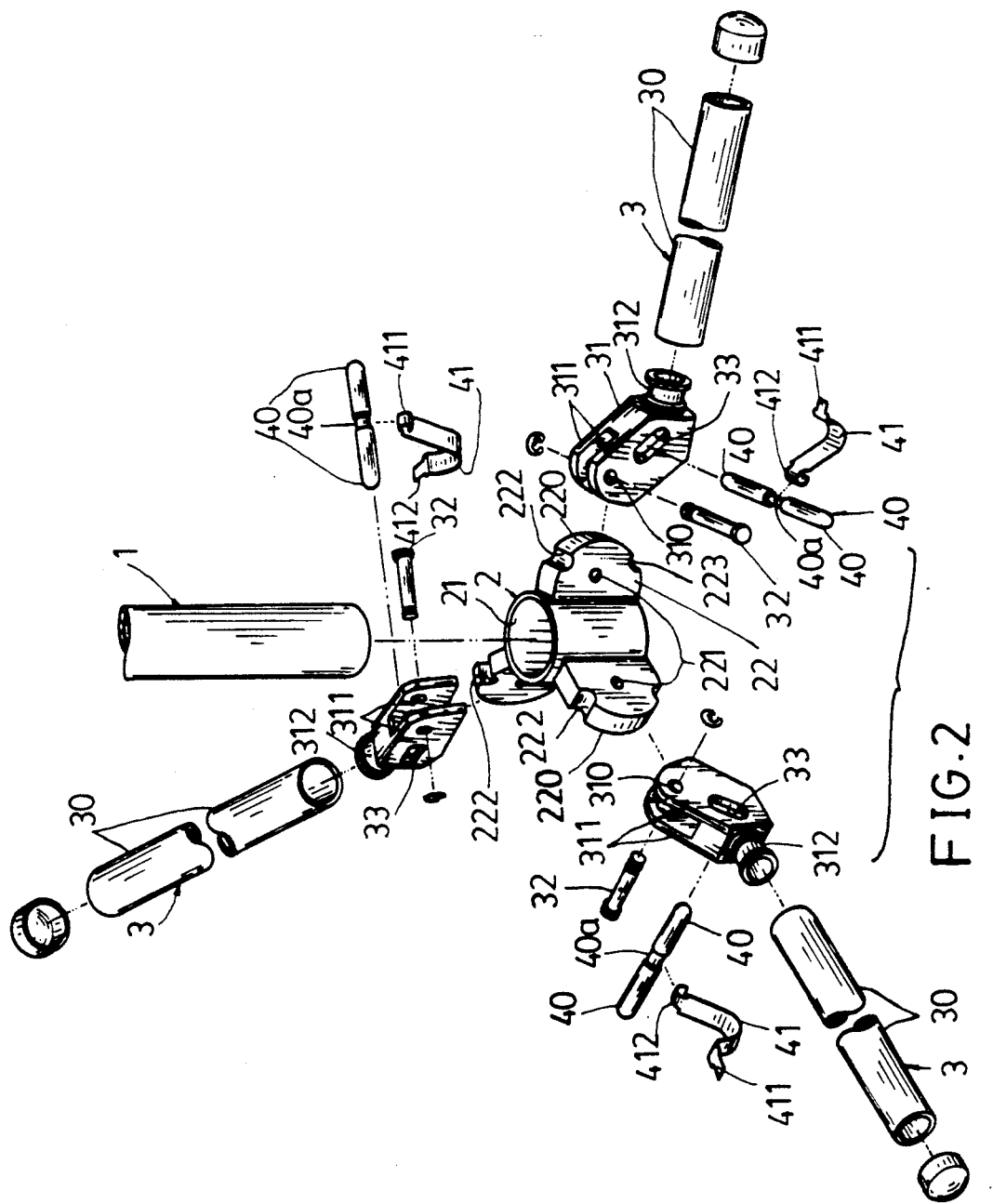
FIG. 2 is an exploded view showing all elements in construction of the present invention.

As shown in FIGS. 1-6, the present invention comprises: a vertical tubular support 1, a connector 2, and a plurality of leg members 3.

The connector 2 includes a sleeve member 21 formed on a central portion of the connector 2 for securing a lower end portion of the vertical tubular support 1, and a plurality of arcuate lugs 22, specifically three arcuate lugs 22 radially formed on a cylindrical surface of the sleeve member 21.

Each arcuate lug 22 includes a pivot hole 221 formed in a central portion of an arcuate cam portion 220 formed on an outer surface of each lug 22, and a plurality of positioning recesses 222, 223 circumferentially formed on the arcuate cam portion 220 of the lug 22 including an upper folding recess 222 formed in an upper portion of the cam 220 and at least a lower extending recess 223 formed in a lower portion of the cam 220. The arcuate cam portion 220 is centered at a center of the pivot hole 221.

Each leg member 3 includes: a radial tubular member 30, a forked joint 31 having an adapter 312 formed on an outer portion of the joint 31 for securing the tubular member 30, and a pivot 32 for pivotally securing each forked joint 31 to each lug 22 of the connector 2. The forked joint 31 includes two bifurcate plates 311 bifurcated from the joint 31 having a pair of aligned pivot holes 310 formed through the two plates 311 for passing the pivot 32 therethrough for pivotally securing the joint 31 on the lug, in which the pivot 32 also passes through the pivot hole 221 formed in the lug 22. Two radial slots 33 are symmetrically formed in the two bifurcate plates 311 on an outer position of each pivot hole 310.

A positioning pin member 4 includes a central neck portion 40a secured with an inner end portion 412 of a tensioning spring 41 having an outer end portion 411 of the spring 41 retained in the adapter 312 of the joint 31, and two side end portions 40 of the pin member 4 protruding sidewardly laterally through the two radial slots 33 formed in the two bifurcate plates 311 to be normally positioned beyond the two radial slots 33 adapted to be pulled by a user's fingers. The pin member 4 is adjustably engageable with anyone recess of the plurality of positioning recesses 222, 223 formed in the arcuate cam portion 220, and is also slidably moving along the arcuate cam portion 220. The tensioning spring 4 normally urges the pin member 4 toward the cam portion 220 or anyone recess 222 or 223.

Figure 3:
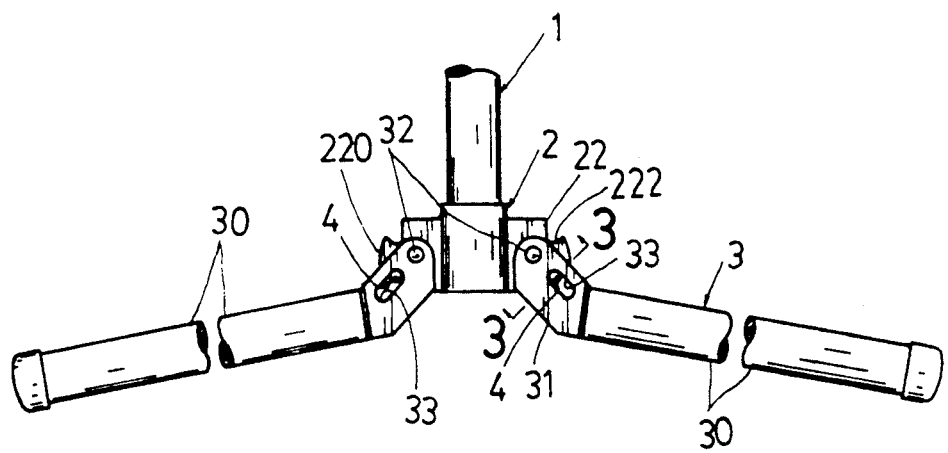
FIG. 3 is a front view of the present invention when erected.
Figure 4:
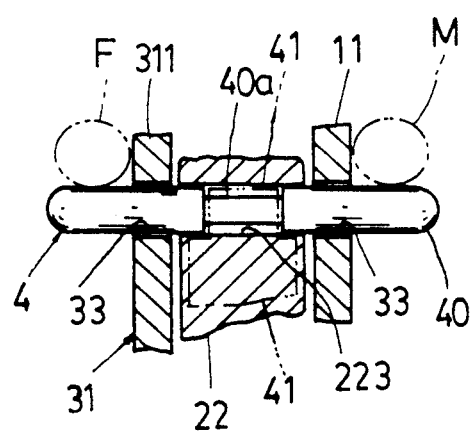
FIG. 4 is a side-view sectional drawing of the present invention when viewed from 3—3 direction of FIG. 3.
Figure 5:
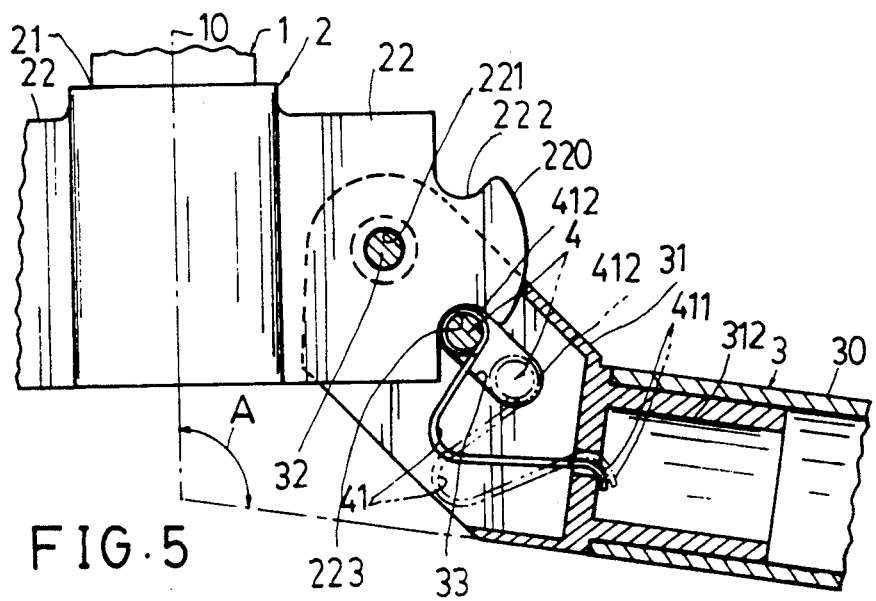
FIG. 5 shows an extended leg about the vertical support of the present invention.

When the positioning pin member 4 is engaged with the lower recess 233 as shown in FIGS. 1, 3 and 5, each leg member 3 is angularly extended to define an obtuse angle A between an axis 10 of the support 1 and the leg 3 to stably support the tubular support 1 vertically for loading a lamp, a camera, or any article on the support 1.

Figure 6:
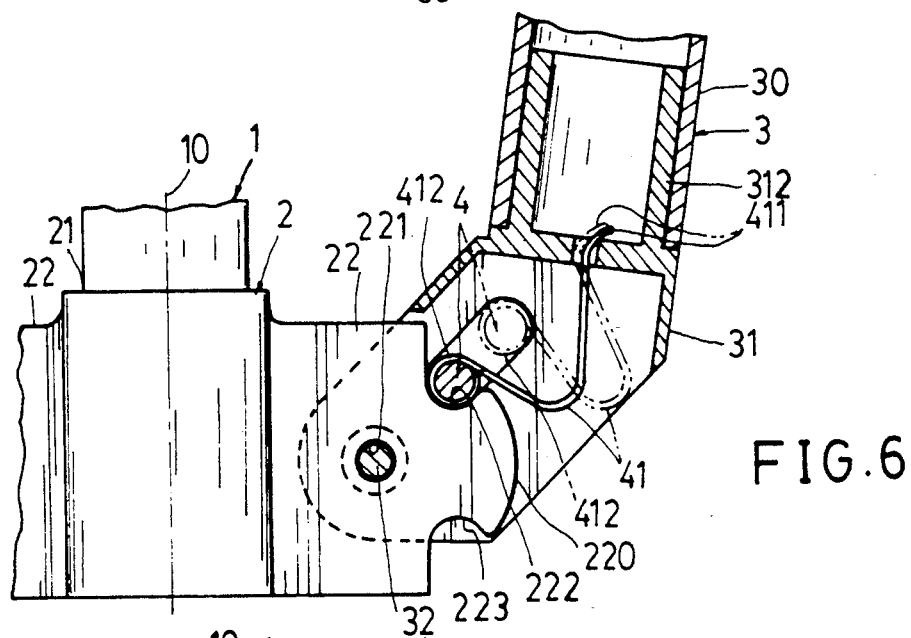
FIG. 6 shows a folded leg of the present invention.

When it is intended to fold the leg members 3, the two side end portions 40 of each pin member 4 is pulled by two fingers F, M of a user as shown in FIG. 1 to disengage the pin 4 from the lower recess 233, and each leg member 3 is upwardly rotated about the pivot 32 to fold the leg members 3 as shown in FIG. 6. At this time, the pin 4 is slidably moved on the arcuate cam portion 220 until being engaged with the upper recess 222.

Figure 7:
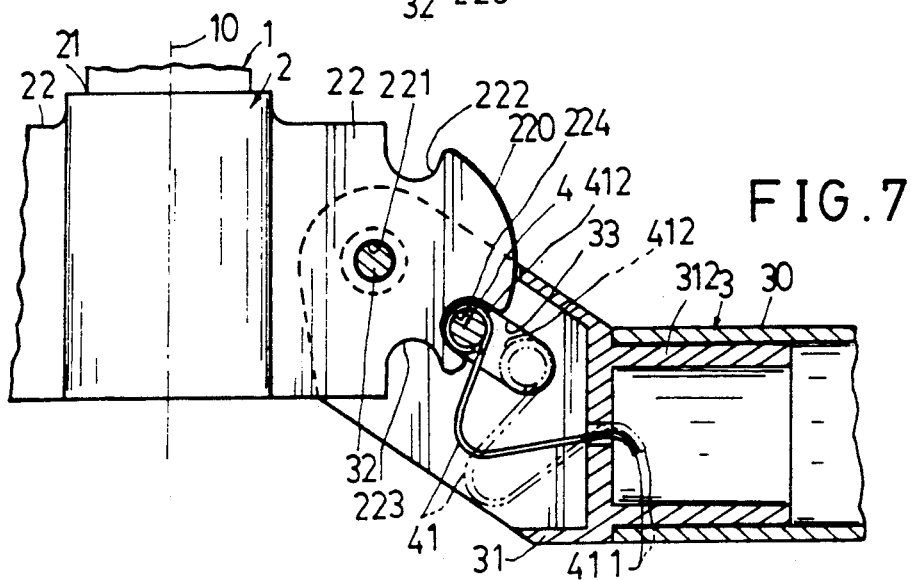
FIG. 7 shows a horizontally extended leg of the present invention.

In FIG. 7, another lower recess 234 is formed in the cam portion 220 above the recess 233 to engage with the pin member 4 to horizontally extend each leg member 3 to define a right angle between the leg 3 and the central vertical support 1.

The number of recesses 232, 233, 234 are not limited in this invention. The lugs 22 and the connector 2 may be integrally formed with engineering plastic materials or metals. Other modifications of the present invention can be made without departing from the spirit and scope of this invention.

Figure 8:
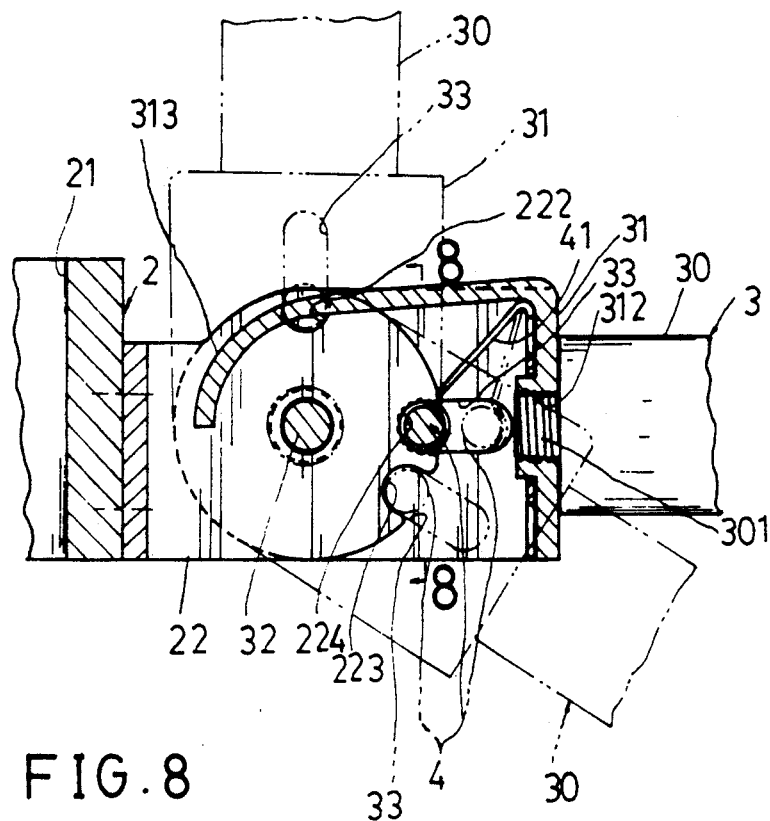
FIG. 8 shows another preferred embodiment of the present invention.
Figure 9:
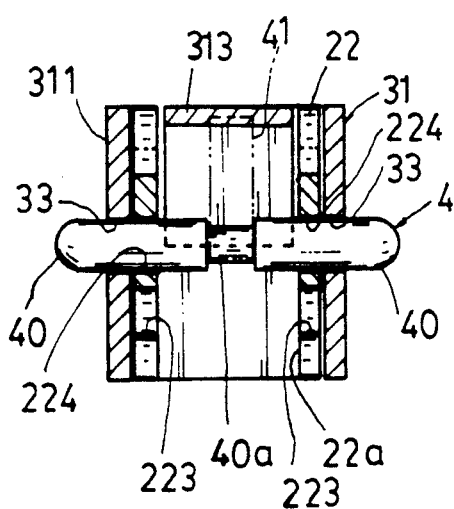
FIG. 9 is a side-view sectional drawing of the present invention when viewed from 8—8 direction of FIG. 8.
Figure 10:
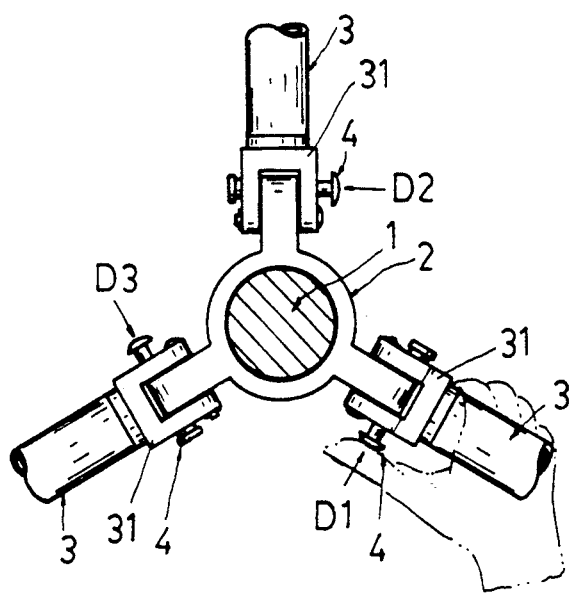
FIG. 10 shows a prior art of U.S. Pat. No. 4,905,946 earlier filed by the present invention.

As shown in FIGS. 8, 9, each lug 22 is made as a hollow lug including a central hollow portion 22a which is modified from a solid lug 22 as shown in FIG. 1 to have a cross section of generally U-shaped. The two bifurcate plates 311 are provided with a central cover 313 for shielding the central hollow portion 22a of the hollow lug 22. The joint 31 may be formed with a female-threaded socket 312 engageable with a male-threaded plug 301 of the leg member 3 for securing each leg member 3 with the joint 31. The recesses 222, 223, 224 are circumferentially formed in the hollow lug 22.

The present invention is superior to U.S. Pat. No. 4,905,946 because two side end portions 40 of each positioning pin member 4 are protruded sidewardly (rightwardly and leftwardly) beyond two slots 33 of each joint 31 of the lug member 3 so that a user's fingers or hand may symmetrically pull the two end portions 40 of the pin member 4 for easily disengaging each leg member 3 from the connector 2 of the support 1 for conveniently adjusting the height of the leg members 3 and the support 1, or for folding or extending the leg members 3 about the support 1 conveniently.

I claim:

1. An adjustable leg assembly comprising:
   a vertical tubular support;
   a connector having a sleeve member formed on a central portion of said connector for securing a lower end of said vertical tubular support in said sleeve member and a plurality of arcuate lugs radially formed on a cylindrical surface of said sleeve member, each said arcuate lug having an arcuate cam portion formed on an outer portion of said lug having a plurality of positioning recesses circumferentially formed on the arcuate cam portion of said lug and a pivot hole formed in said lug and positioned at a center of said arcuate cam portion; and
   a plurality of leg members each said leg member radially pivotally secured to each said lug of said connector by a pivot passing through said pivot hole in said lug, each said leg member having a positioning pin member resiliently and slidably held in said leg member adapted for pulling said pin member to be slidably moving on said arcuate cam portion of said lug to be engageable with any said positioning recess for adjusting an angle between each said leg member and said vertical tubular support for adjusting a height of said leg member and said tubular support, or for folding said leg member toward said support;
   the improvement which comprises:
   each said leg member including: a radial tubular member having its inner end portion secured with a forked joint, two bifurcate plates bifurcated from said forked joint having a pair of aligned pivot holes formed in an inner portion of each said bifurcate plate for pivotally securing said joint to said lug by said pivot passing through said lug of said connector and said pair of aligned pivot holes in said bifurcate plates, and two radial slots symmetrically formed in said two bifurcate plates on two outer portions of said aligned pivot holes, each said positioning pin member slidably held in said two radial slots in said forked joint; and
   each said positioning pin member including two side end portions laterally protruding rightwardly and leftwardly through two said radial slots in said forked joint of said leg member adapted to be pulled by a user's fingers, a central neck portion formed on a central portion of said pin member, and a tensioning spring having an inner end of said spring secured to said central neck portion of said pin member and an outer end of said spring secured to said forked joint for normally resiliently urging said pin member on said arcuate cam portion of said lug of said connector to be slidably engageable with any said positioning recess formed in said cam portion.

2. An adjustable leg assembly according to claim 1, wherein each said lug of said connector is formed as a solid lug.

3. An adjustable leg assembly according to claim 1, wherein each said lug of said connector is formed with a central hollow portion to have a cross section of said lug generally U-shaped.

* * * * *